United States Patent
Berridge

(10) Patent No.: US 8,184,925 B1
(45) Date of Patent: May 22, 2012

(54) SYSTEM FOR CONVERTING A PHOTOGRAPH INTO A PORTRAIT-STYLE IMAGE

(75) Inventor: Robert O. Berridge, Mt. Vernon, IN (US)

(73) Assignee: Berridge & Associates, Mt. Vernon, IN (US)

( * ) Notice: Subject to any disclaimer, the term of this patent is extended or adjusted under 35 U.S.C. 154(b) by 845 days.

(21) Appl. No.: 12/288,600

(22) Filed: Oct. 22, 2008

Related U.S. Application Data

(60) Provisional application No. 60/999,883, filed on Oct. 22, 2007.

(51) Int. Cl.
*G06K 9/36* (2006.01)

(52) U.S. Cl. ........................................ 382/274; 382/284

(58) Field of Classification Search .................. 382/274, 382/276, 284; 345/629, 634, 641
See application file for complete search history.

(56) References Cited

U.S. PATENT DOCUMENTS

| | | | |
|---|---|---|---|
| 4,956,872 A | 9/1990 | Kimura | 382/44 |
| 5,245,432 A | 9/1993 | Jaffray et al. | 358/160 |
| 6,011,536 A | 1/2000 | Hertzmann et al. | 345/112 |
| 6,219,459 B1 | 4/2001 | Kurashige | 382/266 |
| 6,229,904 B1 | 5/2001 | Huang et al. | 382/100 |
| 6,381,361 B1 | 4/2002 | Silverbrook et al. | 382/162 |
| 6,727,906 B2 | 4/2004 | Lockeridge et al. | 345/581 |
| 6,885,761 B2 | 4/2005 | Kage | 382/118 |
| 6,917,718 B2 | 7/2005 | Ichimura | 382/264 |
| 7,209,577 B2 | 4/2007 | McAlpine et al. | 382/113 |
| 2002/0097250 A1* | 7/2002 | Fukushima et al. | 345/629 |
| 2003/0223622 A1 | 12/2003 | Simon et al. | 382/118 |
| 2004/0170337 A1 | 9/2004 | Simon et al. | 382/254 |
| 2004/0208388 A1 | 10/2004 | Schramm et al. | 382/254 |
| 2005/0041867 A1 | 2/2005 | Loy et al. | 382/190 |
| 2005/0286799 A1 | 12/2005 | Huang et al. | 382/275 |
| 2006/0033753 A1* | 2/2006 | Lai | 345/629 |
| 2006/0115172 A1 | 6/2006 | Lin | 382/254 |
| 2006/0204110 A1 | 9/2006 | Steinberg et al. | 382/224 |
| 2006/0228038 A1 | 10/2006 | Simon et al. | 382/254 |
| 2006/0228040 A1 | 10/2006 | Simon et al. | 382/254 |

FOREIGN PATENT DOCUMENTS

JP 2002298136 A 10/2002

* cited by examiner

*Primary Examiner* — Andrew W Johns
(74) *Attorney, Agent, or Firm* — Faegre Baker Daniels LLP

(57) ABSTRACT

The invention relates to a method of transforming a photograph of a person into a portrait. The disclosed method involves manipulating a photograph using software in order to alter the appearance of the photograph. Following the alteration of the photograph, the image will have the appearance of a color picture painted by Norman Rockwell®. The image may also be manipulated in order to take the appearance of a black and white charcoal picture prepared by Norman Rockwell®.

10 Claims, 8 Drawing Sheets
(5 of 8 Drawing Sheet(s) Filed in Color)

SYSTEM FOR CONVERTING A PHOTOGRAPH INTO A PORTRAIT-STYLE IMAGE

This application claims the benefit of U.S. Provisional Patent Application Ser. No. 60/999,883 filed Oct. 22, 2007, the complete disclosure of which is hereby expressly incorporated by reference.

BACKGROUND OF THE INVENTION

1. Field of the Invention

The present invention relates to a system for converting photographs into portraits. In particular, the present invention relates to a system for converting a photograph of a person into an image having characteristics of a Norman Rockwell painting.

2. Description of the Related Art

Devices for transforming picture images into portrait images are known. For example, U.S. Pat. No. 6,219,459, which is incorporated in its entirety herein by reference, discloses an "Image Transform Device for Transforming a Picture Image to a Painting-Type Image." The disclosed device is capable of converting an input image to a linear drawing style in real time. An edge signal of the image is detected and may then be normalized. The normalized edge signal is transformed in a non-linear fashion to decrease the intermediate tone level of the edges. Inversion control may then be utilized to allow the lines to be seen more clearly. Inversion control may also be utilized to reverse the lightness and darkness of the edge signal. The inverted signal may be adjusted and then be mixed with a version of the input signal using an externally controlled radio signal. The resulting output is a drawing or painting-type image. Furthermore, the resulting edges of the image have a high-light and shaded contrast.

U.S. Pat. No. 6,229,904, which is incorporated in its entirety herein by reference, discloses an "Automatic Morphing Photography Booth." The disclosed invention relates to a computerized automatic morphing photography booth. The booth generates a synthesized composite or altered image based upon two or more initial images. The initial images to be converted may either be images captured by the booth or stored images programmed into the memory of the computer. The computer may map out the essential characteristics of the images and convert the images into a composite image by blending, merging and/or superimposing at least some portion of the characteristics of the mapped images. The booth further includes cameras capable of centering the composite image in a picture frame.

U.S. Pat. No. 6,381,361, which is incorporated in its entirety herein by reference, discloses a "Method for Transforming a Gamut of a Color Image to Produce an Artistic Effect." The method includes the predetermined mapping of an input gamut to a desired output gamut, in order to produce a desired artistic effect. The method further includes utilizing mapping of the input gamut to map the input image to an output image having a predetermined output gamut. The method may further include a post processing step of utilizing a brush stroke filter to enhance the effect. The output gamut may be formed by mapping a predetermined number of input gamut values that correspond to output color gamut values and interpolating the remaining input gamut values to output color gamut values. The remaining input gamut values may be interpolated to determine the output color gamut values.

SUMMARY OF THE INVENTION

The present invention relates to a method of turning a photograph into a portrait-style image. Some aspects of the present invention may be accomplished by carrying out certain steps in Adobe Photoshop® in the inventive manner described.

In one embodiment of the invention, a method of transforming a photograph into a portrait-style image is provided, including the steps of providing a computer software capable of manipulating, duplicating, blending and merging a photographic image; providing a photographic image including at least one person depicted therein; identifying and selecting the position of the eyes of the person in the image; raising the eyebrows of the person relative to the position of the eyes selected; enlarging the head of the person based upon and around the position of the eyes; shrinking the size of the shoulders of the person; and expanding the top corners of the image and reducing the base corners to give the image somewhat of an appearance produced by a wide-angle lens.

The steps can be individually initiated using the computer software, or the steps can be performed automatically by the computer software.

The method may further include the step of providing and merging at least one additional image with the image of the photograph. The additional image can have the appearance of substantially texturized cream color on canvas, or a substantially black portion with feathered edges and wherein the black portion of the image extends down further in the center of the image than at the sides. The additional image may also have a substantially blue or turquoise portion having feathered edges and the blue or turquoise portion extends down farther in the center of the image than at the side edges. The additional image may also have a gray or light purple color and the appearance of plaster on canvas.

The method of transforming a photograph into a portrait-style image may further include the steps of rotating the photograph so that the eyes are substantially horizontal, and sizing the photograph so that the distance separating the eyes is set to a predetermined distance.

In another embodiment of the invention, a method of transforming a photograph into a portrait-style image is provided, including the steps of providing a computer software capable of manipulating, duplicating, blending and merging a photographic image; providing a photographic image including at least one person depicted therein; providing at least one additional image to merge with the image of the photograph; lightening selected areas in the photographic image so that a portion of the additional image is visible in the lightened areas; and merging the photographic image and the additional image.

The additional image may have the appearance of substantially texturized cream color on canvas, or the additional image may have a substantially black portion with feathered edges, the black portion of the image extending down further in the center of the image than at the sides. The additional image can also have a substantially blue or turquoise portion having feathered edges, the blue or turquoise portion extending down farther in the center of the image than at the side edges. The additional image can also have a gray or light purple color and the appearance of plaster on canvas.

The method of transforming a photograph into a portrait-style image as may also include the steps of identifying and rotating the photograph so that the eyes are substantially horizontal. The method may further include the step of sizing the photograph so that the distance separating the eyes is set to predetermine distance.

The method may also include the steps of using an alpha channel to select portions of the photographic image, whereby certain operations may be conducted only in the selected portions. One example of an alpha channel is established by a radius around the eyes in the photographic image and a particular texture can be added for the irises, which can be defined by the alpha channel.

The method may also include the steps of embossing a portion of the photographic image to add a specific texture and then using an alpha channel to eliminate the applied texture in part of the embossed portion.

In yet another embodiment of the invention, a method of transforming a photograph into a portrait-style image is provided, including the steps of providing a computer software capable of manipulating, duplicating, blending and merging a photographic image; providing a photographic image including at least one person depicted therein; using an alpha channel to select a certain area of the photographic image; embossing the selected alpha channel area of the photographic image; selecting a second alpha channel area on the photographic image; and lightening or altering the color of the second alpha channel area.

The method can include the steps of duplicating the image and adding layers. The method can also include the steps of selecting alpha channels areas, blurring those areas, duplicating the background, and merging layers.

The method may also include the steps of removing all colors on at least one of the image of layers, except red and green, and rearranging and blending the image layers.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The above-mentioned and other features of this invention and the manner of obtaining them will become more apparent and the invention itself will be better understood by reference to the following description of an embodiment of the present invention taken in conjunction with the accompanying drawing, wherein.

Figure 1A:
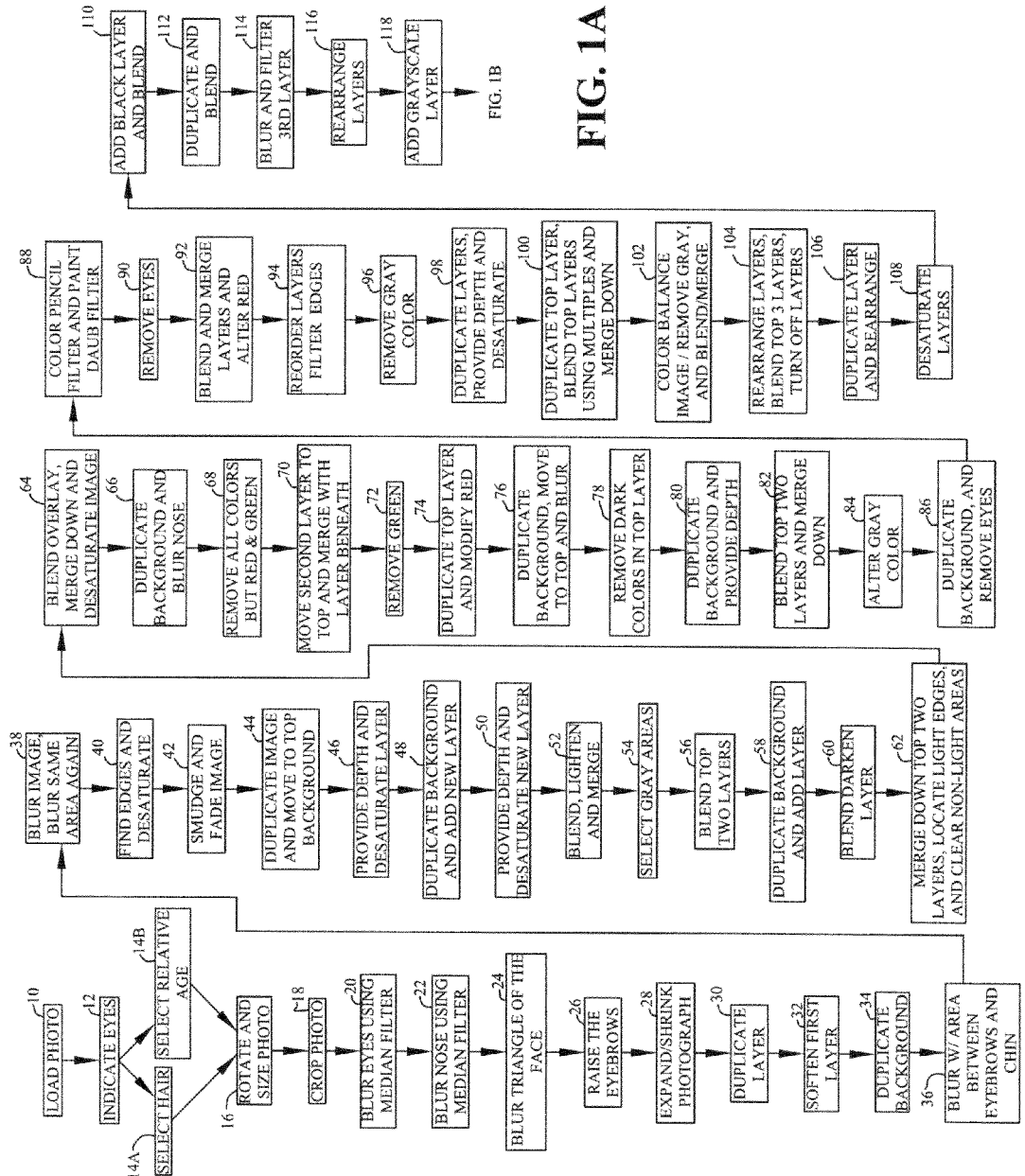
FIGS. 1A and 1B depict a flow chart representing one embodiment of the invention for converting a photograph into a portrait-style image.

Although the drawings represent an embodiment of various features and components according to the present invention, the drawings are not necessarily to scale and certain features may be exaggerated in order to better illustrate and explain the present invention. The exemplification set out herein illustrates an embodiment of the invention, and such exemplification is not to be construed as limiting the scope of the invention in any manner.

DETAILED DESCRIPTION OF AN EMBODIMENT OF THE INVENTION

For the purposes of promoting an understanding of the principles of the invention, reference will now be made to the embodiment illustrated in the drawing, which is described below. It will nevertheless be understood that no limitation of the scope of the invention is thereby intended. The invention includes any alterations and further modifications in the illustrated device and described method and further applications of the principles of the invention, which would normally occur to one skilled in the art to which the invention relates. Moreover, the embodiment was selected for description to enable one of ordinary skill in the art to practice the invention.

Figure 1B:
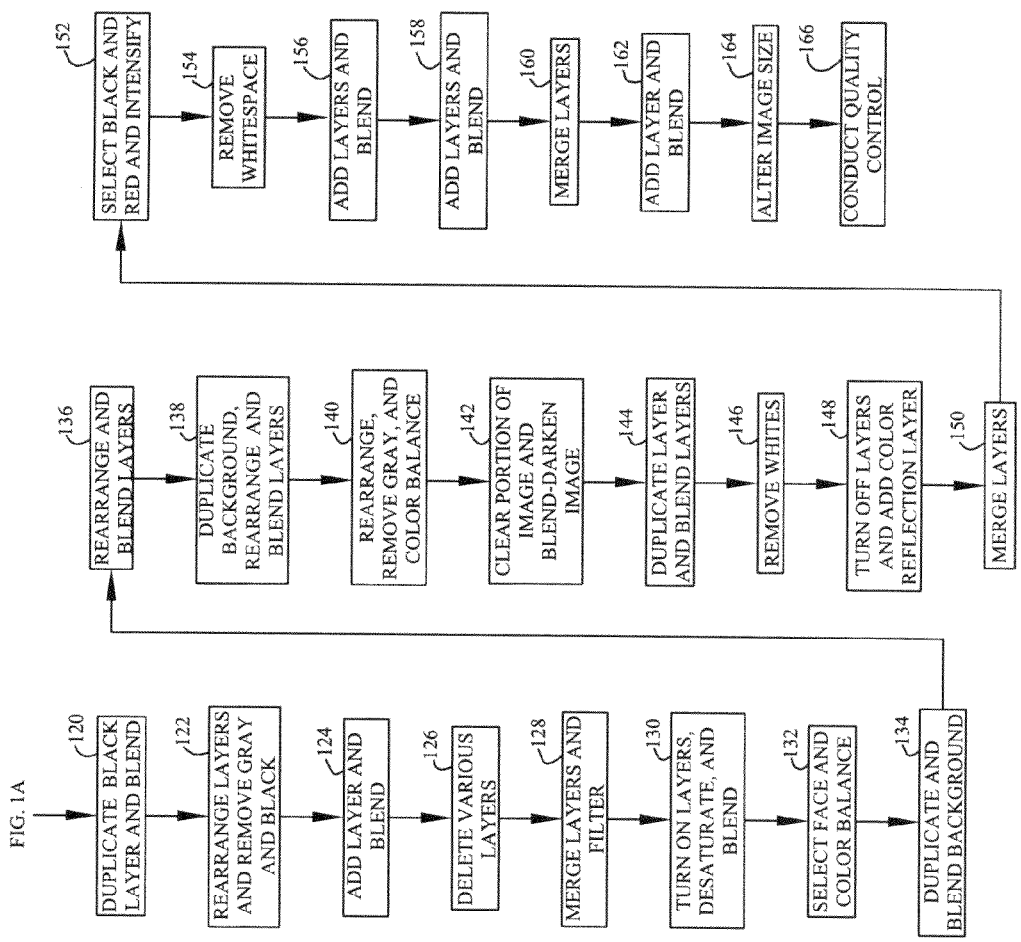

FIGS. 1A and 1B include a block diagram that represents the steps of an illustrative embodiment of the method comprising the present invention. It should be noted that the described method utilizes Adobe Photoshop® and represents the input of commands therein. The method, however, may be accomplished utilizing various software having substantially identical commands or equivalents thereof. In the present invention, in accordance with block 10, a photograph is loaded into the memory of a computer or suitably similar device using known methods such as by scanning or with a CD.

Once the photograph has been loaded into the memory of the computer, an operator locates and indicates the position of the eyes of the person depicted in the photo, as represented by block 12. The operator may select the eyes in any suitable manner. For example, the operator may utilize a mouse in order to move the cursor over the eyes of the person depicted in the photograph and then click the eyes. In embodiments of the invention, the user may utilize a stylus to indicate the location of the eyes, or known computer software capable of detecting and locating the eyes may be employed.

Once the location of the eyes has been indicated, the operator then selects whether the individual has hair below the shoulder or above the shoulder, in accordance with block 14A. In accordance with block 14B, the user also selects if the photographed individual is younger or older. It should be noted that the steps set forth in these two blocks may be combined into one, wherein the user selects from one of four choices, such as older/short hair, older/long hair, younger/short hair and younger/long hair. It should be noted that the determination of whether the photographed individual is younger or older may be a subjective determination by the operator based upon training and experience.

Block 16 represents the operation of rotating the photograph so that the eyes are substantially horizontal. In addition, the photograph is sized so that the distance separating the eyes is equal to a predetermined distance. In the present example, the photograph is sized so that the distance separating the eyes is approximately 0.65 inches.

With respect to block 18, the photograph is cropped in order to size the photograph to a rectangular shape with a height of five inches and a width of four inches. The cropping of the photograph may be based upon the position of the eyes. For example, the top edge of the photograph may be cropped two inches above the eyes, and the lower edge may be cropped three inches below the eyes. The left and right sides of the photograph may be cropped two inches from the center of the distance separating the eyes.

Block 20 represents the next step in the depicted embodiment of the invention. In block 20, the eyes of the person in the photograph are blurred. The selection and blurring of the eyes may be accomplished in any suitable manner. For instance, an alpha channel utilized by the computer software may select the eyes of the person based upon the original indicated position. Once the alpha channel selects the eyes of the person, the selected portion may be blurred. For example, if one is utilizing Adobe Photoshop® software, one may utilize an alpha channel in order to select the eyes and then utilize the median filter in order to blur the eyes. The radius selected in conjunction with the median filter may be any suitable radius, such as 3, for example.

In the step represented by block 22, the bridge of the nose is blurred. For example, if utilizing Adobe Photoshop® software, one can again select the median filter to blur the nose. The radius selected in conjunction with the median filter may be any suitable radius, such as 3, for example. Again, the nose may be selected, in any suitable manner, such as using an alpha channel configured to select the nose, for example.

In the step represented by block 24, the area of the face from above the eyebrows to below the chin is softened. This area of the face may similarly be selected, in any suitable manner, including by utilizing an alpha channel. If utilizing Adobe Photoshop® to manipulate the image, the selected area of the face may be blurred using the smart blur filter. The smart blur settings may be any suitable settings. In the present example, the smart blur feature is accomplished with the radius set to 100, quality set to low, the threshold set to 50, and the mode set to normal.

Block 26 represents the step of raising the eyebrows. Again, this step may be accomplished in any suitable manner. For example, Adobe Photoshop® allows the eyebrows to be raised utilizing the liquify feature.

In the step represented by block 28, the upper portion of the photograph is slightly expanded, and the lower portion of the photograph is slightly decreased, thereby resulting in the head of the person in the photograph being slightly enlarged and the body of the person in the photograph being slightly reduced in size. If utilizing Adobe Photoshop®, this may be accomplished by using the transform function.

Block 30 represents the step of duplicating the layer of the photograph. The duplication of the layer replicates the photograph by adding an additional layer in order to allow the photograph to be manipulated. The replication of the layer creates a background layer and a first layer. As should be understood with one having ordinary skill in the art, Adobe Photoshop® allows multiple layers of various images to be retained in a stack. The layers can be duplicated, and one layer of the stack can be manipulated without necessarily manipulating other layers in the stack.

In the step represented by block 32, the first layer is softened. If using Adobe Photoshop®, this can be accomplished by using the filter dust and scratch. The first layer is softened over the entire photograph in this embodiment. The filter settings may be any suitable to obtain a desired image. In the present embodiment, the filtering may be accomplished with the radius set to 3 and the threshold set to 12. The image may be further softened using the median filter in Adobe Photoshop®, if desired. The radius can be set to any suitable number, such as 3, in the present example.

In the step represented by block 34 the background layer is duplicated. The newly duplicated layer becomes the first layer, and the layer that was formerly the first layer becomes the second layer.

Block 36 represents the step of applying an alpha channel in the shape of a triangle that extends from the eye brows of the photographed person to the chin. Once the alpha channel has been applied to the photograph, the portion of the photograph under the alpha channel can be blurred. In the instance of an operator utilizing Adobe Photoshop®, the operator may blur the layer using the function associated with Gaussian Blur. Any suitable setting may be used for the Gaussian Blur. In the present example, the radius of the Gaussian Blur is set to 33.

In the step represented by the block indicated by numeral 38, the top layer that was blurred in the previous step is blurred again. One utilizing Adobe Photoshop® may blur the image by utilizing the smart blur feature. In the present example, the smart blur is accomplished with settings of radius set to 100, quality set to low, threshold set to 50 and mode set to normal.

Block 40 represents the step of finding the edges in the photograph and desaturate. If using Adobe Photoshop®, the edges can be found using the find edges feature. Once the edges of the photograph have been determined using the find edges feature, the photograph may be desaturated. If utilizing Adobe Photoshop®, the edges can be desaturated by utilizing the desaturate command under the image, adjustments menu. The desaturation of the image removes the color from the photograph, thereby making the photograph black and white.

Block 42 represents the step of smudging the photograph image further. One using Adobe Photoshop® may accomplish this by utilizing the filter "rough pastels." The rough pastels command makes the lines of the present layer look as if they have been drawn on a textured surface. The image may then be faded in order to fade the rough pastels, as if the pastels have been drawn on a slightly smoother surface. The fading of the rough pastels may be accomplished using any suitable command, such as the Fade command.

In the step represented by block 44, the background image is again duplicated. The duplicated background layer is then moved to the top and becomes the top layer to be manipulated.

Block 46 represents the step of converting the top layer into an image that looks as if the image that appears to have depth such as if it had been constructed out of gray clay. One utilizing the software of Adobe Photoshop® may accomplish this by employing the "emboss" command. Once the present layer has been embossed, the excess color can be removed, which can be accomplished with Adobe Photoshop® software using the desaturate command.

Figure 3:
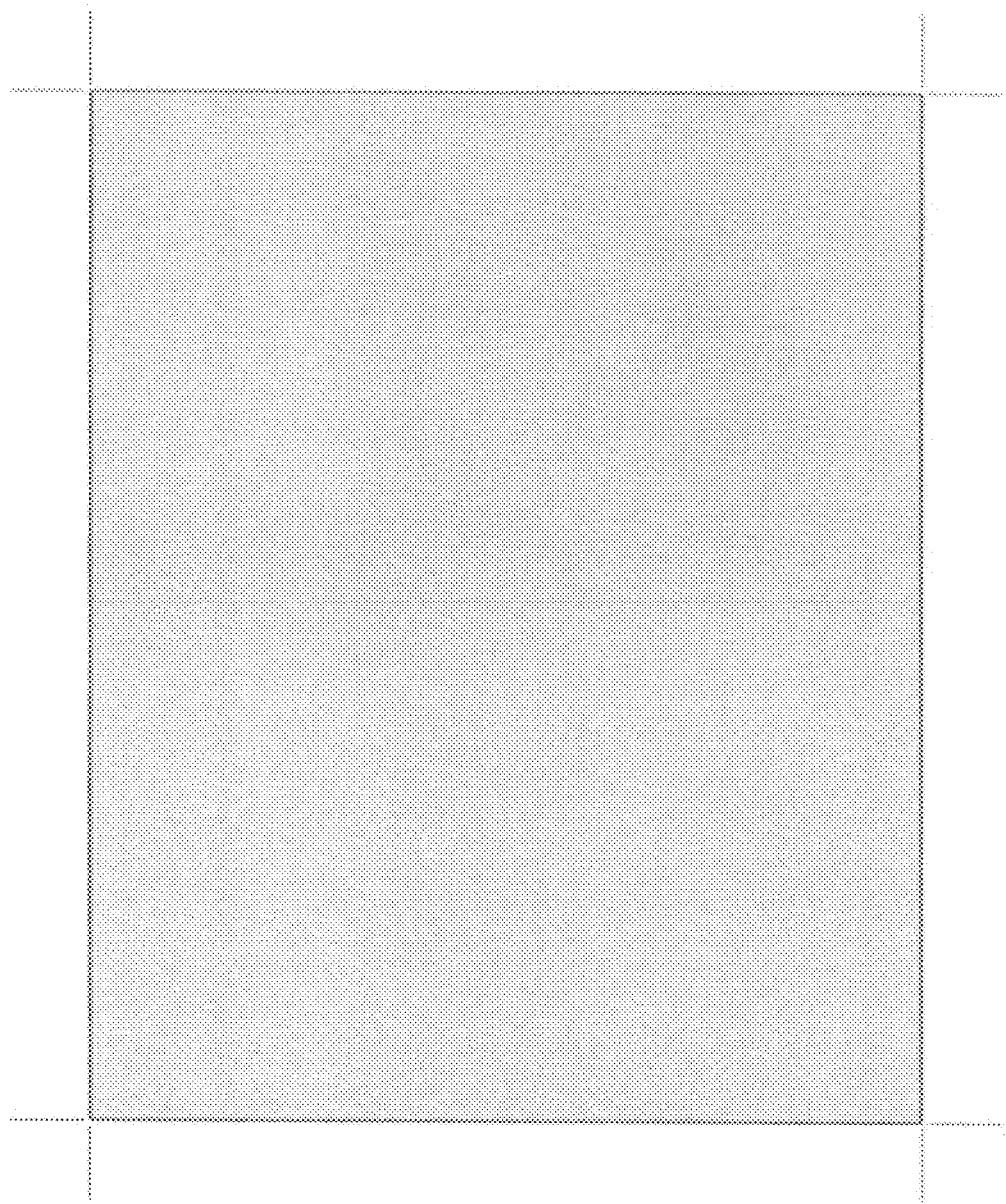
FIG. 3 is a photograph of a fixed image made with plaster of paris on canvas using a brush to provide one of the layers utilized in the process illustrated in FIGS. 1A, 1B and 2.

Block 48 represents the step of duplicating the background layer and adding a layer similar to that depicted in FIG. 3. The background layer may be duplicated in the standard manner and then moved to the top of the layer stack. The layer depicted in FIG. 3 is then added to the top of the stack. In the present example, the layer has a substantially cream color. In the present embodiment, the image in FIG. 3 was created by brushing plaster of paris on a canvas.

Block 50 represents the step of embossing the image and then desaturating the image of the newly added layer. Accordingly, a clay image with no color is being formed essentially from the cream and pink colors of the image. The embossing shows the height, depth and texture of the cream and pink colors of the image.

The step represented by block 52 represents the blending and merging of the layers. The blending may be accomplished by utilizing the blend lighten command in Adobe Photoshop®. Once the layers have been blended using the blend lighten command, the layers may be merged together using the merge down command in Adobe Photoshop®.

Block 54 represents the step of selecting the gray areas of the image, generally located at the hair and other traditionally dark areas. These areas may be selected in any suitable manner. For example, in Adobe Photoshop®, the lasso command can be used to select the dark areas. The inverse of the gray areas are then selected and cleared from the image, in order to leave just the gray areas previously selected.

Block 56 represents the step of blending the top layer into the layer directly below, which can be done utilizing the overlay command in Adobe Photoshop®.

In the step represented by block 58, the background layer is again duplicated. The newly duplicated layer is then moved to the top of the stack of the layers. Once the layer has been moved to the top of the stack, another layer similar to that depicted in FIG. 3 is added to the top of the layer stack.

Block 60 represents the step of blend darkening of the layer at approximately 33% capacity. It should be noted that in embodiments of the invention, any suitable capacity may be utilized when blending and darkening the layers in Adobe Photoshop®. The blending and darkening of the layer removes the texture from the present layer.

In the step represented by block 62, the top two layers are merged down. When the layers have been merged down, the light edges of the resulting image are located. The inverse areas are selected and then the selected areas are cleared. In general, this results in the layer including just the light areas of the image being displayed, such as the forehead, underneath the eyelids and the area of the upper lip. The remaining areas also have a clay type texture.

Block 64 represents the step of blending the image overlay and then merging down the top image onto the second image. The combined image is then merged down onto the layer beneath, which is the full embossed layer. The resulting image is then desaturated in order to remove any color from the image.

In the step represented by block 66, the background layer is again duplicated and moved to the top of the stack of layers. The nose area of the image is then selected using an alpha channel and the image is blurred. One utilizing Adobe Photoshop® may accomplish this by using the smart blur feature after selecting the nose area using an alpha channel or other suitable means. The usage of the smart blur feature smoothes out the nose or selected area. The smart blue features may be set to any suitable settings. For example, in the present illustration, class is set to smart blur, radius is set to 100, quality is set to low, threshold is set to 50 and mode is set to normal.

Block 68 represents the steps of replacing suitable colors. For example, a brown color may be selected throughout the image and then replaced with an alternative suitable shade of brown or an alternative color. Colors selected and replaced in the image should be any color other than green or red. Accordingly, the resulting image comprises substantially only green and red.

Block 70 represents the movement of the second layer above the first layer and the merging of the now first layer onto the previous first layer. The resulting image displays substantially green skin including red lips, cheeks and nose. The merging of the layers may be accomplished using the blend overlay command in Adobe Photoshop®.

The step represented by block 72 removes the green from the image. The resulting image is an embossed version of the image with red lips, cheeks and the tip of the nose overlaid thereon.

In the step represented by block 74, the top layer is duplicated. All of the red colors in the top layer are then selected and may be lightened, intensified, or altered in any suitable manner.

In the step represented by block 76, the background layer is again duplicated and moved to the top of the layer stack. The image is then blurred. One utilizing Adobe Photoshop® may blur the image using the smart blur feature. At this point, the smart blur settings may include a radius set to 25, quality set to low, threshold set to 25 and mode set to normal.

Block 78 represents the step of replacing the color in the top layer. In this layer, the darker colors are replaced and removed form the top layer.

In the step represented by block 80, the background layer is duplicated and moved to the top of the layer stack. Depth is provided to the top layer, which can be accomplished on Adobe Photoshop® using the emboss command in a manner similar to that described above, thereby giving the layer the appearance of a gray clay sculpture. Once the layer has been embossed, it may also be desaturated.

Block 82 represents the step of blending the top two layers, which may be blended using luminosity in Adobe Photoshop®. And then the two layers are merged down.

Block 84 represents the step of replacing the grays of the merged layer. Specifically, the grays of the merged layer may be altered or removed, in any suitable manner.

The step of duplicating the background layer and moving the duplicate layer to the top is represented by block 86. The eyes of the person in the layer may then be selected in any suitable manner, such as by an alpha channel, for example. The eyes are then removed from the image. One utilizing the software Adobe Photoshop® may accomplish this by clearing the eyes.

The step of duplicating the top layer and then altering the image to looks as if it is a pencil drawing is represented by block 88. One utilizing Adobe Photoshop® may achieve the effect of a colored pencil by utilizing the colored pencil filter in Adobe Photoshop®, if desired. Once the image has been changed into a pencil drawing, one alters the image to look as if it has been formed by paint daubs. One utilizing Adobe Photoshop® may accomplish this by using the paint daubs filter.

Block 90 represents the step of selecting the eyes and removing them. One utilizing Adobe Photoshop® may select the eyes in any suitable manner, such as using an alpha channel, for example. The eyes may then be removed in any suitable manner, such as by clearing.

Block 92 represents the step of blending the top two layers in overlay and then merging the layers together. The color red is then removed from the blended image, in a suitable manner. The reds may then be altered in any suitable manner.

Block 94 represents the step of moving the layer created by the step represented by block 32 to the top of the stack of layers. Once this layer has been moved to the top of the stack, the filter poster edges in Adobe Photoshop® may be applied to the image. The poster edges filter looks at the edging or contrast in the file and outlines the contrast areas. In applications not utilizing Adobe Photoshop®, this may be accomplished in any suitable manner.

Block 96 represents the step of replacing the gray color in the image. The replaced gray color may be modified in any suitable manner, such as by being removed, enhanced or softened.

Block 98 represents the step of duplicating the layer formed from the step represented by block 32. The layer formed from this step may then be embossed, or turned into a gray clay representation to provide depth, in the manner described above. Once the image has been embossed, the image may then be desaturated.

Block 100 represents the step of duplicating the top layer. Once the top layer has been duplicated, the top two layers may then be blended using the multiply setting in Adobe Photoshop®. In embodiments of the invention, the blending may be set of hard light. The blend multiply setting does not alter the white highlights in the image. Once the layers have been blended, they may then be merged down together.

The step of color balancing the image is represented by block 102. Specifically, one utilizing Adobe Photoshop® may utilize the color balance function to turn the image into a green and blue image. The color balance function may be utilized a second time in order to turn the image into a blue and gray image. The gray color may then be selected and removed from the image, in any suitable manner. The resulting image is then blended and merged utilizing the color dodge function onto the layer below.

In the step represented by block 104, the layer formed by the step represented by block 88 is moved to the top of the layer stack. In Adobe Photoshop®, this layer is blended using the darkened function, and the second layer is blended to the third layer using linear burn. The layers formed after the steps represented by block 40, block 68, block 88, block 92 and block 102 may be turned off.

Block 106 represents the step of duplicating the second layer from the top and moving the new layer just above the background layer.

Block 108 represents the step of desaturating various layers, as may be suitable, in order to remove color from various layers. Any suitable layers may be chosen to have the color removed there from, in order to obtain the desired effect.

The step represented by block 110 involves adding an additional layer being similar to black paint drawn on a transparency. In one embodiment, the layer depicted in FIG. 4 may be used, which is an image of black paint on canvas with dry brushed edges. The additional layer may be added as the second layer and then blended with the third layer utilizing the screen function in Adobe Photoshop®.

Block 112 represents the step of duplicating the fifth layer, and then blend the two layers together utilizing the blend multiply function in Adobe Photoshop®.

The step represented by block 114 involves blurring the third layer utilizing the Gaussian blur function of Adobe Photoshop®. Once the layer has been blurred, the layer may be filtered using the texturizer command in Adobe Photoshop. In the present example, the radius of the Guassian blur is set for 4, 8.

Figure 4:
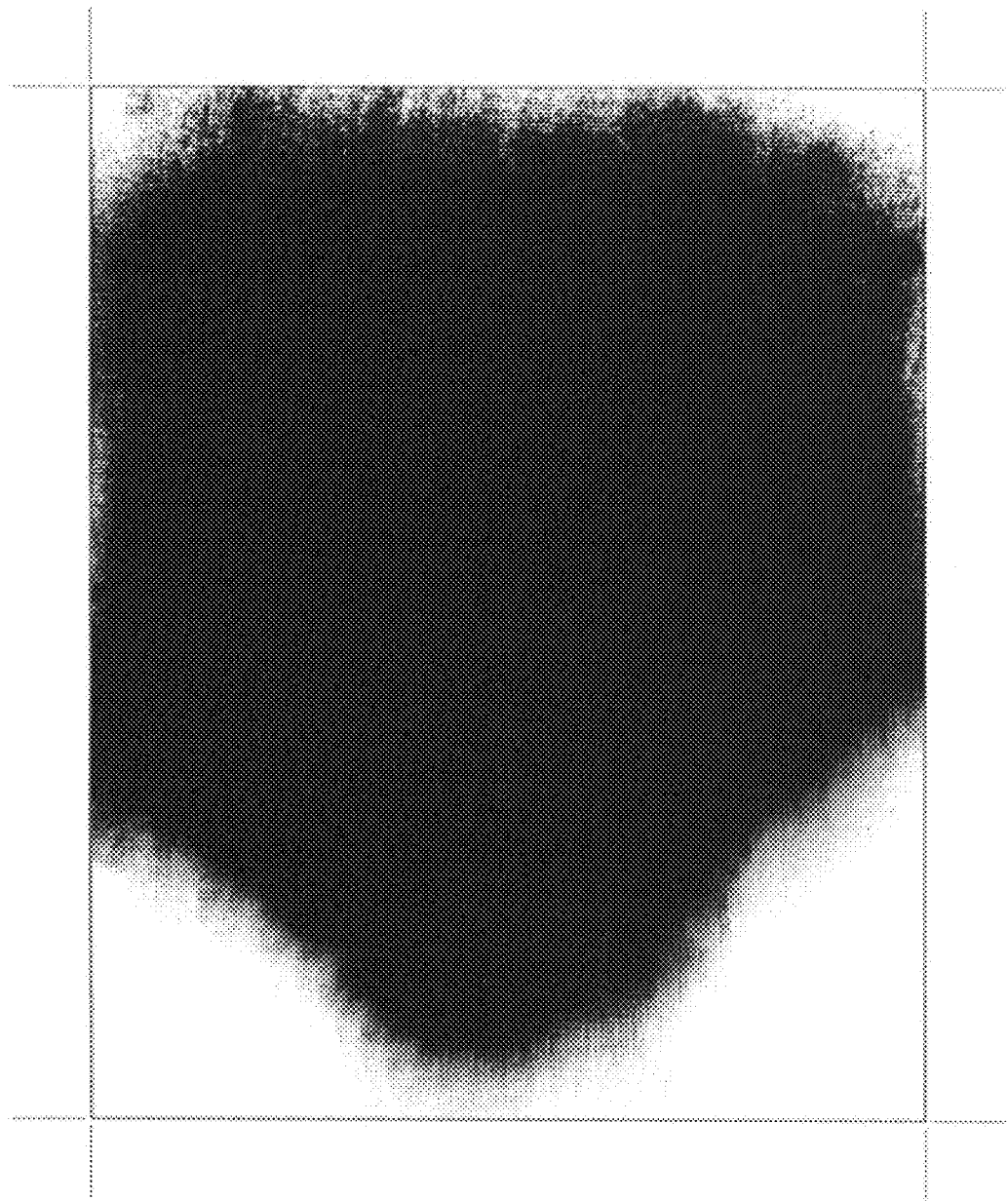
FIG. 4 is a photograph of a fixed image of black paint on canvas to provide one of the layers utilized in the process illustrated in FIGS. 1A, 1B and 2.

The step of moving the black matted layer, which is similar to the layer depicted in FIG. 4, added in the step represented by block 110 to the top of the stack is represented by block 116.

Block 118 represents adding a gray scale layer as the third layer in the stack. The step represented by block 118 includes adding a layer involving a reflection at the eyes and pupil to the layer stack at the top of the stack. The reflection layer succeeds in adding blues and grays to the eyes based upon the position of colors already on the eye.

Block 120 represents the step of duplicating the black layer added in the step represented by block 110 and then blending utilizing the screen function of Adobe Photoshop that layer with the reflection layer added in the above step.

In the step represented by block 122, the fifth layer is moved to the second layer. After the layer has been moved, the gray colors are selected and removed from the image. The black colors may then be removed from the image.

In the step represented by block 124, a layer which has a plaster look may be added as the first layer in the stack of layers previously turned off. This file may then be blended using the multiply function.

Block 126 involves deleting the layer added in the step represented by block 110, its duplicate, the layer added in the step represented by block 118 and the layer formed by the step in block 88. These layers may also be turned off, rather than deleted, if desired.

Block 128 involves the step of merging down the layer added in the step of block 124 with the layer below. The layer may then be altered with the posterized filter of Adobe Photoshop®.

Block 130 represents the step of turning on the layers previously turned off and adding the layer with substantially green skin and red lips to the top of the layers. This layer may then be desaturated using the appropriate command in Adobe Photoshop®. Once the layer has been desaturated, the color black may be selected and then lightened up, in an appropriate manner. This layer may then be blended with the multiply setting at 50 percent.

Block 132 represents selecting the face of the image formed in block 130. The selection may be added using an alpha channel. Once the face has been selected, color balance may be achieved by adding red to the selected area.

Block 134 represents the step of duplicating the background layer. The newly formed duplicate layer is moved to the top of the layer stack. The layer may then be blended using the color command in Adobe Photoshop®.

Block 136 represents the step of moving the layer formed in block 48 to the top of the layer stack and then blending the layers using the color burn command in Adobe Photoshop®.

Block 138 represents the step of duplicating the background layer and moving the duplicate layer to the top. The dark gray color is selected and then lightened up. The layer is then blended using the overlay function in Adobe Photoshop®.

The step represented by block 140 involves moving the layer formed in the step represented by block 90 to the top of the layer stack. The color gray from the image is selected and then removed from the image. The image may then be altered by using the paint daubs feature in Adobe Photoshop®. The image may then be color balanced with dark blue in order to enrich the dark areas with blue.

Block 142 represents the step of selecting a portion of the image from the eyebrows to the chin and then clearing that portion of the image. The selection may occur utilizing an alpha channel. Once that portion of the image has been cleared, one may then blend darken the image.

Block 144 represents the step of duplicating the cream colored transparency, discussed above, and moving the transparency to the top layer. The transparency is then blended using the multiply command in Adobe Photoshop®.

Block 146 represents the step of removing the whites from the layer formed in the step represented by block 40. This may be achieved by utilizing the color select function and removing the white color.

Block 148 represents the step of turning off or deleting the second and third layers in the layer stack. Once the layers have been turned off, a layer involving color reflection is added to the layer stack as the top layer.

Block 150 represents the step of merging all of the visible layers in the layer stack.

Block 152 represents the step of selecting the black color and intensify the selected color. In embodiments of the invention, red may be selected and also be intensified.

Block 154 represents the step of selecting the canvas in order to remove excess whitespace on the canvas originally formed when the size of the head and shoulders was altered. The image size may then be altered too in order to bring the image to a size of 4 by 5 inches at 300 dots per inch.

Figure 5:
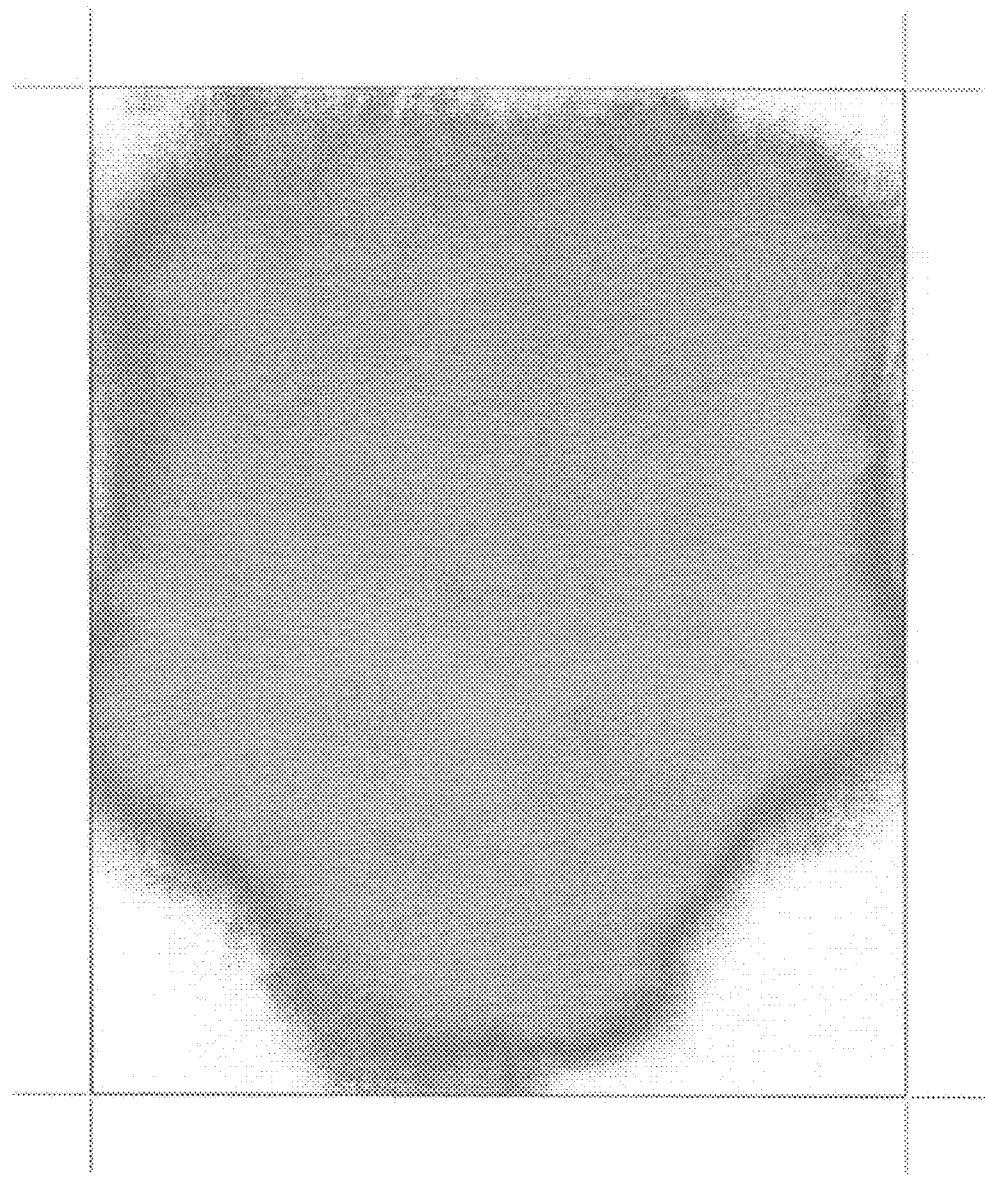
FIG. 5 is a photograph of a fixed image of a painting on canvas with a bluish paint to provide one of the layers utilized in the process illustrated in FIGS. 1A, 1B and 2.

In the step represented by block 156, a layer including a turquoise color, similar to that shown in FIG. 5, is added under the merged image. FIG. 5 is an image of a painting on canvas and provides a blended area near the end and illuminates or brings out the texture to make it more visible. The image is blended using the screen command. A second image involving an embossed 4 by 5 inch image is added to the layer stack. The added layer is placed below the last image. The image is blended using the overlay command.

Figure 6:
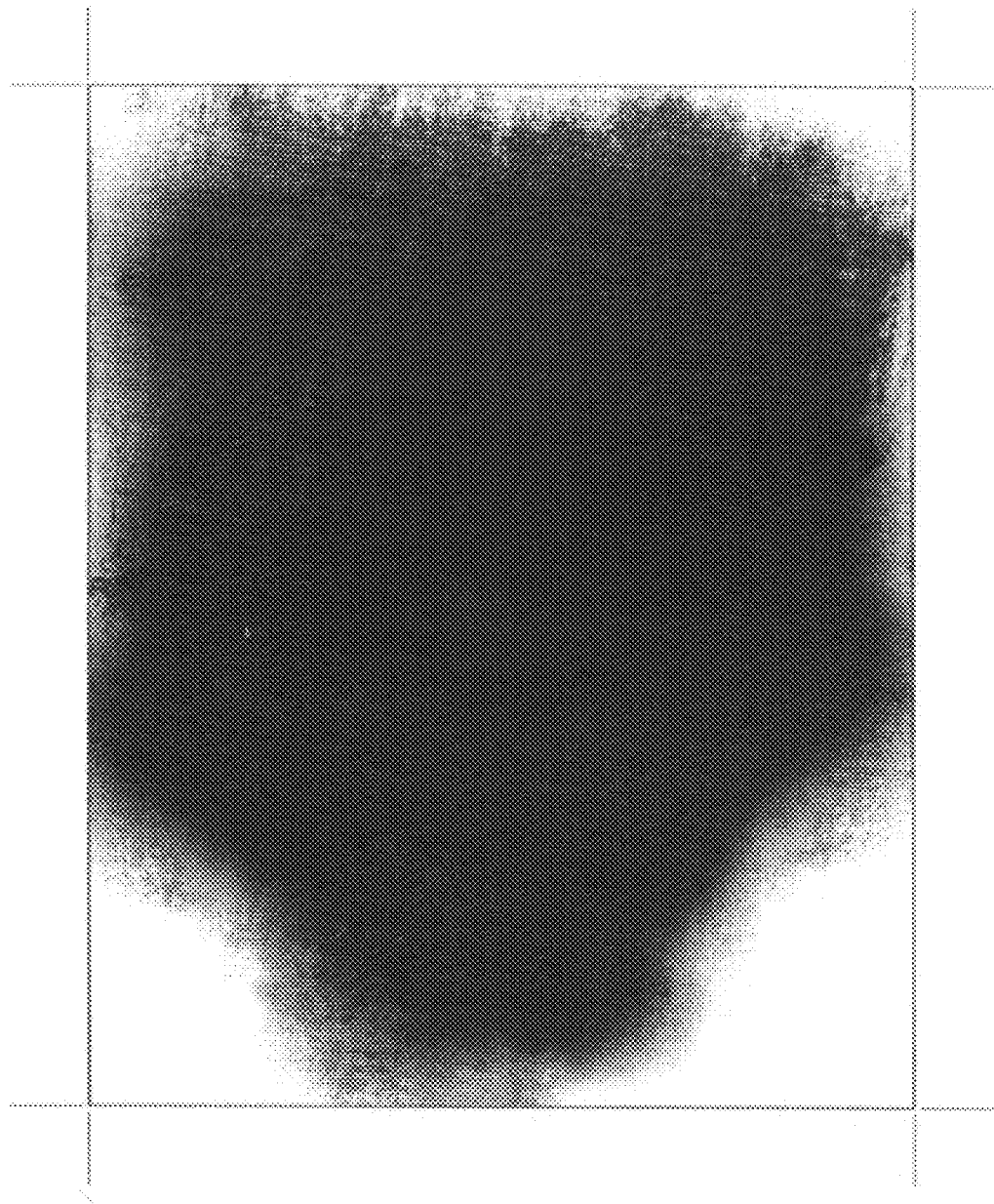
FIG. 6 is a photograph of a fixed image of a painting on canvas with black paint to provide one of the layers utilized in the process illustrated in FIGS. 1A, 1B and 2.
Figure 7:
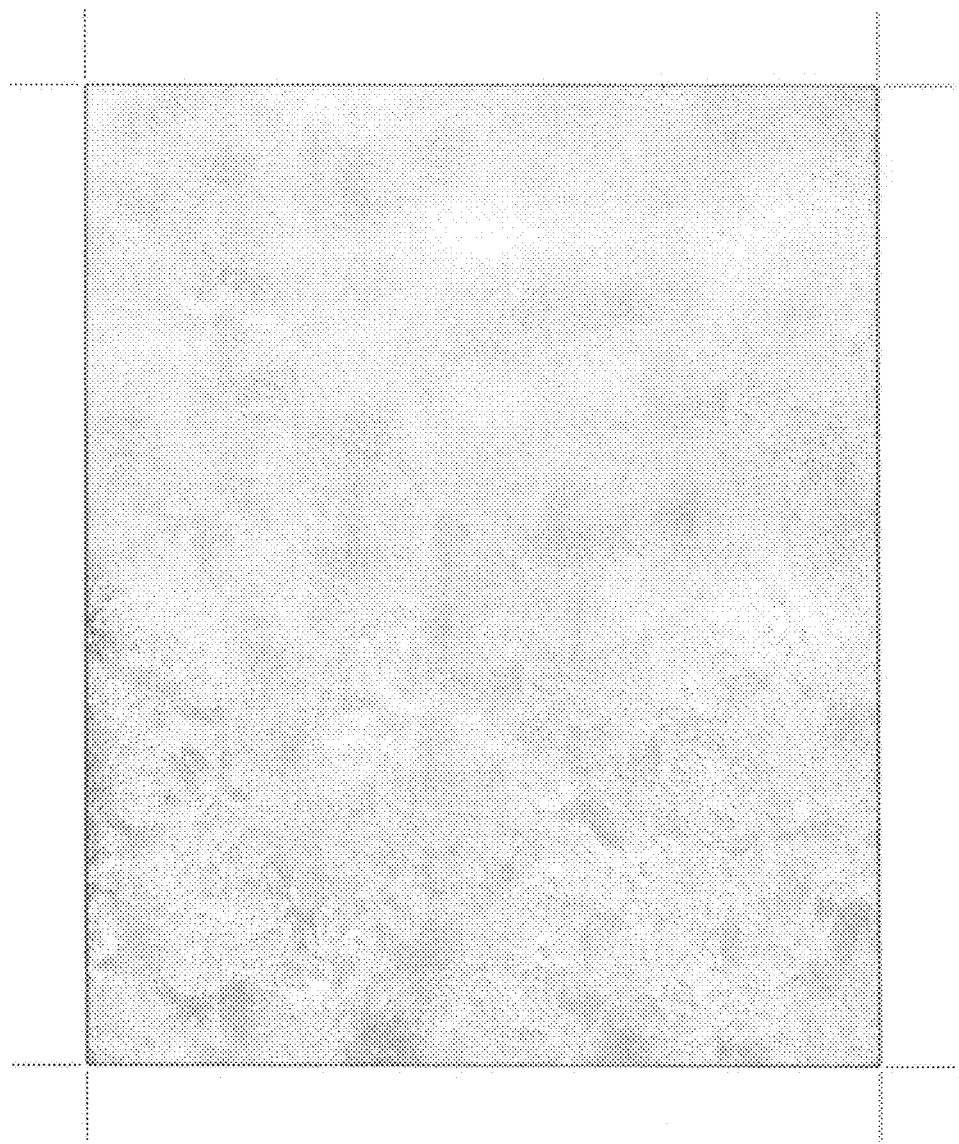
FIG. 7 is a photograph of a fixed image made with plaster on a canvas board to provide one of the layers utilized in the process illustrated in FIGS. 1A, 1B and 2.

The step represented by block 158 involves adding a gray layer, similar to that shown in FIG. 7, to the bottom of the layer stack. The image in FIG. 7 was produced with plastic on a canvas board. A layer involving black painting, similar to that shown in FIG. 6, on canvas with exposed edges is added to the layer stack. FIG. 7 is an image produced from a painting on canvas with black paint. The black provides contrast. The edges give the impression that an artist feathered the edges with a brush. The layer is added to the top of the layer stack. The layer is blended using the screen command. The layer in the third spot of the stack is blended using linear burn in Adobe Photoshop®.

Block 160 represents the step of merging all of the layers together using the visible command in Adobe Photoshop®.

Block 162 represents the step of adding a transparency. The transparency is added to the stack and is blended soft light at 50 percent. The transparency is then merged visible.

Block 164 represents the step of altering the image size to make the size approximately 16 by 20 inches.

Block 166 represents the step of setting quality control tests for the image. Quality control buttons may be formed in any suitable manner. For example, the hue saturation of the image involves the color removal, and the color can be added back into the image until an acceptable level is achieved. This process can involve a hue saturation 1 mask. Similarly, buttons bright contrast 21, bright contrast 12, select color 100, select color 64 and select color 33 may be utilized to check for quality. Each of these buttons may be utilized by a quality control person to adjust the image if the quality of the image is insufficient for the quality of the image.

Figure 2:
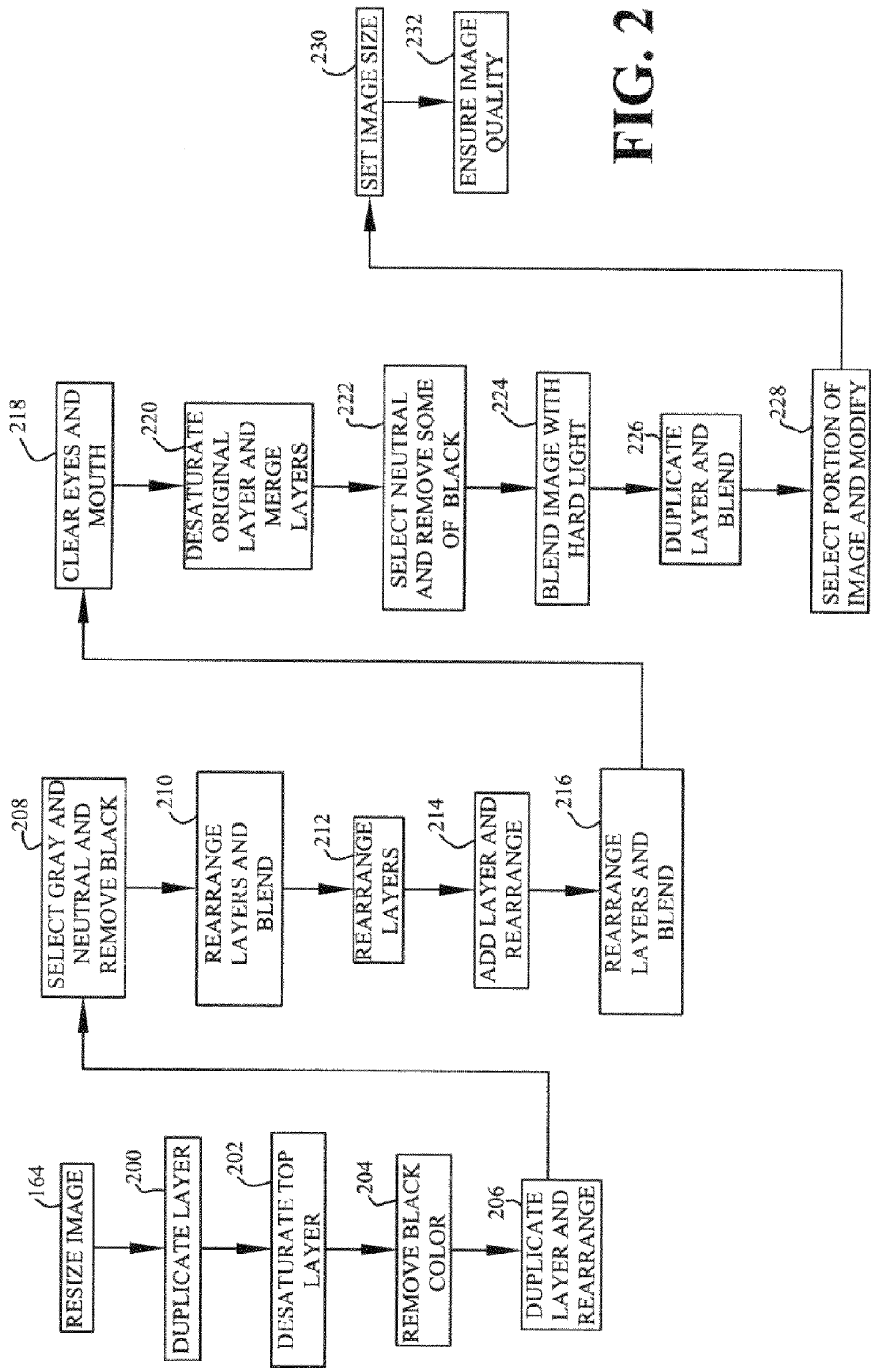
FIG. 2 depicts a flow chart representing a second embodiment of the invention.

The above method may be modified in order to make a charcoal sketch out of a photograph also. In order to modify the method to create charcoal, the above steps are carried out until block 164 is reached. Then instead of following the steps outlined in FIG. 1, a different sequence is followed as shown in FIG. 2, wherein block 200 represents the step of duplicating the layer.

Block 202 represents the step of desaturating the top layer, and block 204 represents the step of selecting the black color and removing the black color from the layer.

Block 206 represents the step of duplicating the layer and moving the duplicate layer to the bottom of the layer stack.

Block 208 represents the step of selecting the color gray and neutral in the top layer and removing all the black color from the selected colors.

Block 210 represents the step of rearranging the layers in order to move a pencil layer to the top. The layer may then be blended using multiply.

Block 212 represents the step of rearranging the order of the layers.

Block 214 represents the step of adding a layer including a pencil file, to the stack and rearranging the layers. The additional layer may only cover the face of the image but not the clothing.

Block 216 represents the step of rearranging the layers to ensure an embossed layer is below the pencil layer. The layers may then be blended linear light by 50 percent.

Block 218 represents the step of selecting the eyes and mouth and then clearing them from the image in the embossed layer.

Block 220 represents the step of desaturating the original layer formed by the step represented by block 164. The layers may then be merged visible.

Block 222 represents the step of selecting the neutral color and removing 50% of the black from the image.

Block 224 represents the step of blending the desaturated image with a hard light.

Block 226 represents the step of duplicating the layer formed in the step represented by block 202 and then blending the layer with linear burn at 50%. This layer may then by switched with the layer above.

Block 228 represents the step of lassoing the head of the image without lassoing clothing, if the image has short hair. If the image includes long hair, the head and body are lassoed. Once the lasso has been completed, the image is modified using feather 33, expand 57, radius 7 command and select the inverse. The now selected area is cleared. In addition, various layers are cleared.

Block 230 represents the step of selecting the image and setting the image size.

Block 232 represents the step of ensuring the quality of the image. This may be accomplished in any suitable manner. For example, a trained quality control person may darken the image, lighten the image, enhance the image or modify the image, as desired.

While this invention has been described as having an exemplary design, the present invention may be further modified within the spirit and scope of this disclosure. For example, it should be appreciated that all or some of the steps in the process may be carried out either manually or with the aid of a computer program (in addition to Adobe Photoshop®). It should also be noted that the steps may be varied somewhat in sequence, some of the steps may be eliminated, or some steps may be added, and the overall effect of obtaining an image similar in appearance to a Norman Rockwell® painting may still be achieved. The application is intended, therefore, to cover any variations, uses, or adaptations of the invention using its general principles. Further, this application is intended to cover such departures from the present disclosure as come within known or customary practice in the art to which this invention pertains.

The invention claimed is:

1. A method of transforming a photograph into a portrait-style image including the steps of:
   providing a computer software capable of manipulating, duplicating, blending and merging a photographic image;
   providing a photographic image including at least one person depicted therein;
   providing at least one additional image to merge with the image of the photograph;
   lightening selected areas in the photographic image so that a portion of the additional image is visible in the lightened areas; and
   merging the photographic image and the additional image.

2. The method of transforming a photograph into a portrait-style image as set forth in claim 1, wherein the additional image has the appearance of substantially texturized cream color on canvas.

3. The method of transforming a photograph into a portrait-style image as set forth in claim 1, wherein the additional image has a substantially black portion with feathered edges and wherein the black portion of the image extends down further in the center of the image than at the sides.

4. The method of transforming a photograph into a portrait-style image as set forth in claim 1, wherein the additional image has a substantially blue or turquoise portion having feathered edges and the blue or turquoise portion extends down farther in the center of the image than at the side edges.

5. The method of transforming a photograph into a portrait-style image as set forth in claim 1, wherein the additional image has a gray or light purple color and the appearance of plaster on canvas.

6. The method of transforming a photograph into a portrait-style image as set forth in claim 1, further including the steps of identifying and rotating the photograph so that the eyes are substantially horizontal.

7. The method of transforming a photograph into a portrait-style image as set forth in claim 6, further including the step of sizing the photograph so that the distance separating the eyes is set to predetermine distance.

8. The method of transforming a photograph into a portrait-style image as set forth in claim 6, further including the steps of using an alpha channel to select portions of the photographic image whereby certain operations are conducted only in the selected portions.

9. The method of transforming a photograph into a portrait-style image as set forth in claim 8, wherein the alpha channel is established by a radius around the eyes in the photographic image and texture is added particularly for the irises.

10. The method of transforming a photograph into a portrait-style image as set forth in claim 8, including the step of embossing a portion of the photographic image to add a specific texture and then using an alpha channel to eliminate the applied texture in part of the embossed portion.

* * * * *